United States Patent [19]

Neyer

[11] Patent Number: 4,517,682
[45] Date of Patent: May 14, 1985

[54] METHOD AND AN APPARATUS FOR SYNCHRONIZING RECEIVED BINARY SIGNALS

[75] Inventor: Norbert Neyer, Zürich, Switzerland
[73] Assignee: LGZ Landis & Gyr Zug AG, Zug, Switzerland
[21] Appl. No.: 470,523
[22] Filed: Feb. 28, 1983
[30] Foreign Application Priority Data
Jun. 9, 1982 [CH] Switzerland .................. 3549/82
[51] Int. Cl.³ ............................................. H04L 7/00
[52] U.S. Cl. ..................................... 375/106; 371/47
[58] Field of Search ........................... 371/42, 46, 47; 364/721, 733, 735, 514; 375/106, 108, 111; 370/100, 105

[56] References Cited
U.S. PATENT DOCUMENTS
3,665,396 5/1972 Forney, Jr. ............................ 371/46
4,059,825 11/1977 Greene .................................. 371/42
4,412,329 10/1983 Yarborough, Jr. ................... 371/47

*Primary Examiner*—Benedict V. Safourek
*Attorney, Agent, or Firm*—Ernest F. Marmorek

[57] ABSTRACT

In an apparatus for synchronizing received binary signals, the duration of each bit of the received signals to be synchronized is an integral multiple n of the duration of an original bit, and each original bit has a reception quality factor which is stored in time succession, in respect of the individual original bits, in a common quality factor memory. Quality factor differences of successive original bits are formed by means of a differencing means, and the quality factor differences of those original bits which have the same serial number within a reception bit are added by means of adding circuit. The maximum of the summed quality factor differences of n successive original bits is determined by means of a maximum decision circuit. The addresses of the original bits are continuously adapted in such a way that that of the original bit having the maximum summed quality factor difference receives a given, constant and predetermined value. That original bit is then subsequently used as a first original bit of a reception bit, for synchronization.

5 Claims, 6 Drawing Figures

'1111111100000000111111110000000 0'

'111100001111000011110000 1111 0000'

'110011001100110011001100 11001100'

'1010101010101010101010101010 1010'

Fig. 6    TABLE A

| Serial No of the original bits: | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Quality factor $G_i$: | (0), 5 | 3 | 4 | -2 | 0 | 1 | 3 | 0 | -2 | -1 | -2 | 0 | 1 | 0 | 3 | 12 | 15 | 13 | 16; -10 |
| $\|\Delta G_i\|$: | 5 | 2 | 1 | 6 | 2 | 1 | 2 | 3 | 2 | 1 | 1 | 2 | 1 | 1 | 3 | 9 | 3 | 2 | 3 | 26 |
| $\Sigma\|\Delta G_i\|$: | 5 | 2 | 1 | 6 | 7 | 3 | 3 | 9 | 9 | 4 | 4 | 11 | 10 | 5 | 7 | 20 | 13 | 7 | 10 | 46 |
| Addresses: | "3","2" | "1" | "0" | "2" | "1" | "0" | "2" | "1" | "0" | "3" | "2" | "1" | "0" | "3" | "2" | "1" | "0" | "3" | | |

METHOD AND AN APPARATUS FOR SYNCHRONIZING RECEIVED BINARY SIGNALS

BACKGROUND OF THE INVENTION

The invention relates to methods of and apparatus for synchronizing received binary signals.

U.S. patent application Ser. No. 439,328 filed on Nov. 4, 1982 by the present applicant, in which some claims have already been allowed, proposes a method of correcting distortion of a received signal which, after demodulation, comprises a deformed binary pulse train. After correction of distortion, the received signal is synchronized in a receiver for a fixed transmission rate of for example 100 bd (Baud) by means of a mains a.c. voltage of a power supply main system and by means of using a predetermined sequence or "pre-sequence" of alternating logic values "1" and "0".

SUMMARY OF THE INVENTION

One of the principal objects of the present invention is to provide an apparatus for synchronizing received binary reception signals whose bit duration is an integral multiple n of the duration of an original bit, wherein the original bit is a bit which is already synchronized and has duration which is equal to the bit duration of that received signal which is transmitted at the highest transmission rate, and wherein each original bit has a reception quality factor which is stored in time succession in respect of the individual original bits in a common quality factory memory, said apparatus comprising means for forming the quality factor differences of successive original bits, means for adding the quality factor differences of those original bits which have the same serial number within a received bit, means for determining the maximum of the summed quality factor differences of n successive original bits, and means for continuously so adapting the addresses of the original bits that that of the original bit having the maximum summed quality factor difference is made equal to a given, constant and predetermined value, the said bit then being used as the first original bit of a received bit, for synchronization.

Another object of the present invention is to provide a method of synchronizing received binary signals whose bit duration is an integral multiple n of the duration of an original bit, wherein the original bit is a bit which is already synchronized and has a duration which is equal to the bit duration of that received signal which is transmitted at the highest transmission rate, wherein each original bit has a reception quality factor which is stored in time succession in respect of the individual original bits in a common quality factory memory, said method comprising forming the quality factor differences of successive original bits, adding the quality factor differences of those original bits which have the same serial number within a received bit, determining the maximum of the summed quality factor differences of n successive original bits, and continuously so adapting the addresses of the original bits that that of the original bit having the maximum summed quality factor difference is made equal to a given, constant and predetermined value, the said bit then being used as the first original bit of a reception bit, for synchronization.

A preferred embodiment of the present invention described hereinbelow provides a method and apparatus which, without involving a high level of cost, permits a received signal already synchronized at the highest permissible transmission rate to be synchronized also automatically when the transmission rate is an integral divisor, for example 50 bd, 25 bd or 12.5 bd, of the highest permissible transmission rate of for example 100 bd.

The above-mentioned preferred embodiment of the invention will now be described in greater detail, by way of illustrative and non-limiting example, with reference to the accompanying drawings.

BRIEF DESCRIPTION OF THE DRAWINGS

FIG. 6 is a Table A illustrating a numerical example of the synchronizing circuit of FIG. 1.

DESCRIPTION OF THE PREFERRED EMBODIMENT

Figure 1:
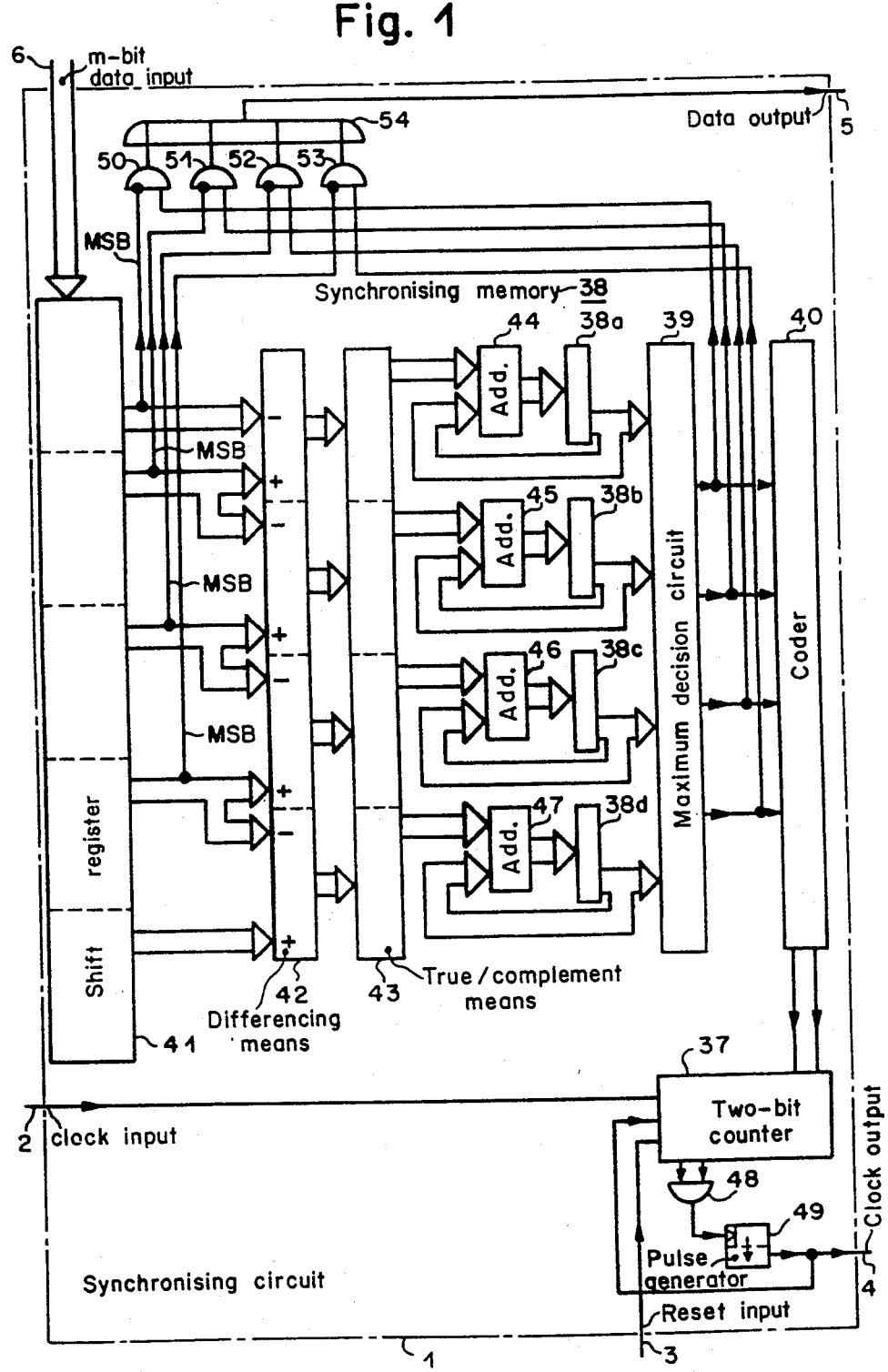
FIG. 1 is a block circuit diagram of a synchronizing circuit.

Referring to the drawings, the same reference numerals are used throughout the figures of the drawing to denote identical components. All of the components referred to in the description as 74... are available from Texas Instruments, Dallas, Tex., U.S.A., and are described in the databook "The Integrated Circuits Catalog for Design Engineers" of Texas Instruments.

A synchronizing circuit 1 shown in FIG. 1 comprises a clock input 2, a reset input 3, a clock output 4, a data output 5 and an m-bit data input 6. The synchronizing circuit 1 further comrpises a two-bit counter 37, a synchronizing memory 38 having four cells 38a, 38b, 38c and 38d, a maximum decision circuit 39, a coder 40, a shift register 41, a differencing means 42, a component 43 referred to as a true/complement means, adding circuits 44 to 47, an AND-gate 48, a pulse generator 49, further AND-gates 50 to 53 and an OR-gate 54.

The following are directly connected by means of single-wire connections:

the most significant bit (MSB) output of the last four of a plurality of cells of the shift register 41 each of a respective inverting input of one of the four AND-gates 50 to 53, more specifically, the first cell being connected to an input of the AND-gate 50, the second cell being connected to an input of the AND-gate 51, the third cell being connected to an input of the AND-gate 52, and the fourth cell being connected to an input of the AND-gate 53;

a first output of the maximum decision circuit 39 to a second input of the AND-gate 50, a second output of the circuit 39 to a second input of the AND-gate 51, a third output of the circuit 39 to a second input of the AND-gate 52, and a fourth output of the circuit 39 to a second input of the AND-gate 53;

the four outputs of the circuit 39, each to respective ones of four inputs of the coder 40;

two outputs of the coder 40, each to respective ones of the two parallel inputs of the 2-bit counter 37;

two parallel outputs of the counter 37, each to respective ones of the two inputs of the AND-gate 48;

an output of the AND-gate 48 to an input of the pulse generator 49;

an output of the pulse generator 49 to the clock output 4 of the synchronizing circuit 1 and to a setting input of the counter 37;

the clock input 2 of the synchronizing circuit 1 to a clock input of the counter 37;

the reset input 3 of the synchronizing circuit 1 to the reset input of the counter 37;

outputs of the AND-gates 50 to 53, each to respective ones of the four inputs of the OR-gate 54; and an output of the OR-gate 54 to the data output 5 of the synchronizing circuit 1.

The following are connected by means of direct m-bit bus connections:

an m-bit output of the first cell of the shift register 41 to a plus-input of a first cell of the differencing means 42;

an m-bit output of the second cell of the shift register 41 to a minus-input of the first cell and to a plus-input of a second cell of the differencing means 42;

an m-bit output of the third cell of the shift register 41 to a minus-input of the second cell and to a plus-input of a third cell of the differencing means 42;

an m-bit output of the fourth cell of the shift register 41 to a minus-input of the third cell and to a plus-input of a fourth cell of the differencing means 42;

an m-bit output of a fifth cell of the shift register 41 to a minus-input of a fourth cell of the differencing means 42;

an m-bit output of each cell of the differencing means 42 to an m-bit input of respective ones of the four cells of the true/complement means 43;

an m-bit output of each cell of the true/complement means 43 to a first m-bit input of a respective one of the four adding circuits 44, 45, 46 and 47;

each m-bit output of the four adding circuits 44, 45, 46 and 47 to a m-bit input of respective ones of the four cells 38a, 38b, 38c and 38d of the synchronizing memory 38;

each m-bit output of the four cells 38a, 38b, 38c and 38d of the synchronizing memory 38 to second m-bit inputs of the associated adding circuits 44, 45, 46 and 47, respectively, and to one of four m-bit inputs of the circuit 39; and the m-bit data input 6 of the synchronizing circuit 1 to an m-bit input of the shift register 41.

By way of example, the shift register 41 may comprise m parallel-operating 74LS96 circuits, the differencing means may comprise a plurality of 74LS83 circuits with 74H87 circuits connected to the inputs thereof, the true/complement means 43 may comprise a plurality of 74H87 circuits, the adding circuits 44 to 47 may comprise 74LS83 circuits, the synchronizing memory 38 may comprise a plurality of 74LS75 circuits, the pulse generator 49 may comprise a 74121 circuit, the counter 37 may comprise a 74LS191 circuit, the AND-gates 48 and 50 to 53 may comprise 74LS08 circuits, associated inverters may comprise 74LS04 circuits, and the OR-gate 54 may comprise a 7425 circuit.

Figure 2:
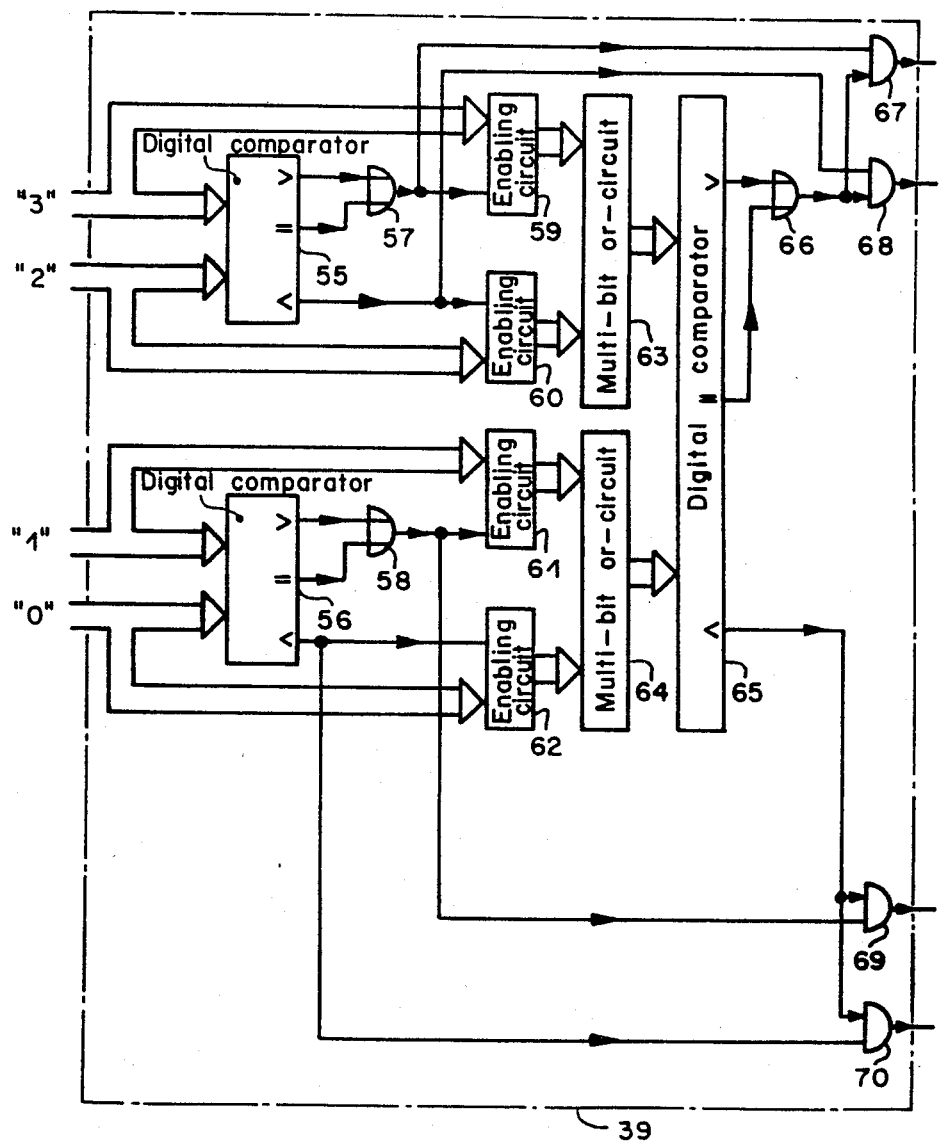
FIG. 2 is a block circuit diagram of a maximum decision circuit forming part of the synchronizing circuit of FIG. 1.

The maximum decision circuit 39 of the synchronizing circuit 1, as shown in FIG. 2, comprises two digital comparators 55 and 56, two OR-gates 57 and 58, four enabling circuits 59 to 62, two multi-bit OR-circuits 63 and 64, a digital comparator 65, a further OR-gate 66 and four AND-gates 67 to 70.

The following are directly connected by means of single-wire connections:

a "higher"-output of the comparator 55 to a first input of the OR-gate 57, and an "equal"-output of the comparator 55 to a second input of the gate 57;

a "higher"-output of the comparator 56 to a first input of the OR-gate 58, and an "equal"-output of the comparator 56 to a second input of the gate 58;

a "lower"-output of the comparator 55 to an enabling input of the enabling circuit 60 and a first input of the AND-gate 68;

a "lower"-output of the comparator 56 to an enabling input of the enabling circuit 62 and a first input of the AND-gate 70;

an output of the OR-gate 57 to an enabling input of the enabling circuit 59 and a first input of the AND-gate 67;

an output of the OR-gate 58 to an enabling input of the enabling circuit 61 and a first input of the AND-gate 69;

a "higher"-output of the comparator 65 to a first input of the OR-gate 66, and an "equal"-output of the comparator 65 to a second input of the gate 66;

an output of the OR-gate 66 to second inputs of each of the AND-gates 67 and 68;

a "lower"-output of the comparator 65 to second inputs of each of the AND-gates 69 and 70; and outputs of the AND-gates 67 to 70 to respective ones of the four outputs of the maximum decision circuit 39.

The following are directly connected by means of m-bit bus connections:

a first input of the circuit 39 to a first data input of the comparator 55 and a data input of the enabling circuit 59;

a second input of the circuit 39 to a second data input of the comparator 55 and a data input of the enabling circuit 60;

a third input of the circuit 39 to a first data input of the comparator 56 and a data input of the enabling circuit 61;

a fourth input of the circuit 39 to a second data input of the comparator 56 and a data input of the enabling circuit 62;

an output of the enabling circuit 59 to a first input of the multi-bit OR-circuit 63, and an output of the second enabling circuit 60 to a second input of the multi-bit OR-circuit 63;

an output of the enabling circuit 61 to a first input of the multi-bit OR-circuit 64, and an output of the enabling circuit 62 to a second input of the multi-bit OR-circuit 64; and an output of the multi-bit OR-circuit 63 to a first data input and the output of the multi-bit OR-circuit 64 to a second data input of the comparator 65.

By way of example, the comparators 55, 56 and 65 may each comprise a 74LS85 circuit, and AND-gates 67 to 70 and the four enabling circuits 59 to 62 may each comprise 74LS08 circuits, and the OR-gates 57, 58 and 66 and the two multi-bit OR-circuits 63 and 64 may comprise 74LS32 circuits.

Figure 3:
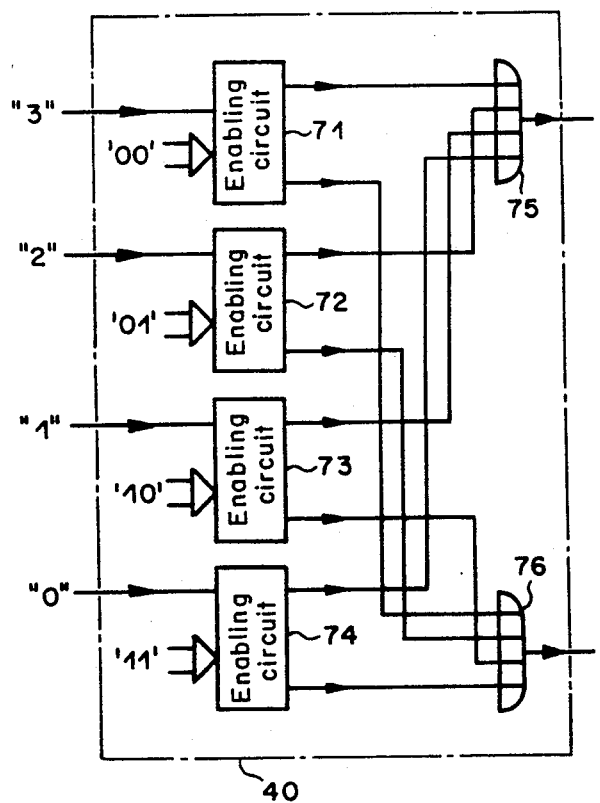
FIG. 3 is a block circuit diagram of a coder forming part of the synchronizing circuit of FIG. 1.

The coder 40 of the synchronizing circuit 1, as shown in FIG. 3, comprises four enabling circuits 71 to 74 and two OR-gates 75 and 76.

The following are directly connected by means of single-wire connections;

the four inputs of the coder 40, each to an enabling input of respective ones of the four enabling circuits 71 to 74;

first outputs of the four enabling circuits 71 to 74 to respective inputs of the OR-gate 75;

second outputs of the four enabling circuits 71 to 74 to respective inputs of the OR-gate 76; and outputs of the OR-gates 75 and 76 to respective ones of the two outputs of the coder 40.

The bit combination "00" is applied to a 2-bit data input of the circuit 71, the bit combination "01" is applied to a data input of the circuit 72, the bit combination "10" is applied to a data input of the circuit 73, and the bit combination "11" is applied to a data input of the circuit 74.

The OR-gates 75 and 76 are for example of type 7425 and the enabling circuits 71 to 74 each comprise for example two AND-gates of type 74LS08.

The manner of operation of the synchronizing circuit 1 will now be described. The received bits of a received binary signal are generally deformed. Depending on the degree of the deformation, a reception quality factor $G_i$ can be specified in respect of each bit, wherein i denotes the serial number of the individual bit in the received signal. An example of defining a reception quality factor $G_i$ is described in the above-mentioned U.S. patent application Ser. No. 439,328.

The received signals can be transmitted at different transmission rates, for example 100 bd, 50 bd, 25 bd and 12.5 bd, wherein the highest transmission rate is generally an integral multiple n of the other transmission rates. Therefore, each received bit comprises an integral number n of original bits, wherein an original bit is a bit whose duration is equal to the bit duration of that received signal which is transmitted at the highest transmission rate. The duration of a received bit at a rate of 50 bd therefore corresponds to two bit durations of an original bit, the duration of a received bit at a rate of 25 bd corresponds to four bit durations of an original bit, and that at a rate of 12.5 bd corresponds to eight bit durations of an original bit, when the transmission rate thereof is 100 bd.

The received signals at the highest transmission rate and thus also the original bits are already synchronized in a manner which is known per se and which will therefore not be described in greater detail herein. The clock signal at the clock input 2 of the synchronizing circuit 1 shown in FIG. 1 is of a period which is equal to the bit period of the original bit, namely ten milliseconds at a rate of 100 bd.

The reception quality factors $G_i$ of the individual original bits are determined for example in accordance with the process described in the above-mentioned U.S. patent application Ser. No. 439,328, and stored in time succession, in respect of the individual original bits, in a common quality factor memory (not shown).

When a satisfactory binary value "1" is received $G_i$ is for example of a high positive value, while when a satisfactory binary value "0" is received, $G_i$ is for example a negative value, with a high absolute value.

If the apparatus which is synchronized at 100 bd is operated at 50 bd, 25 bd or 12.5 bd, then without additional steps it is not clear which of the two, four or eight original bits present during a received bit duration introduces the received bit duration at the other transmission rates mentioned.

The quality factors $G_i$ of the various original bits are stored in time succession in the quality factor memory at the end of each 100 bd-bit duration, in the form of m-bit digital values, wherein, as already mentioned, i=0, 1, 2, . . . gives the serial number of the original bit and $G_0$ is assumed to be 0.

Figure 4:
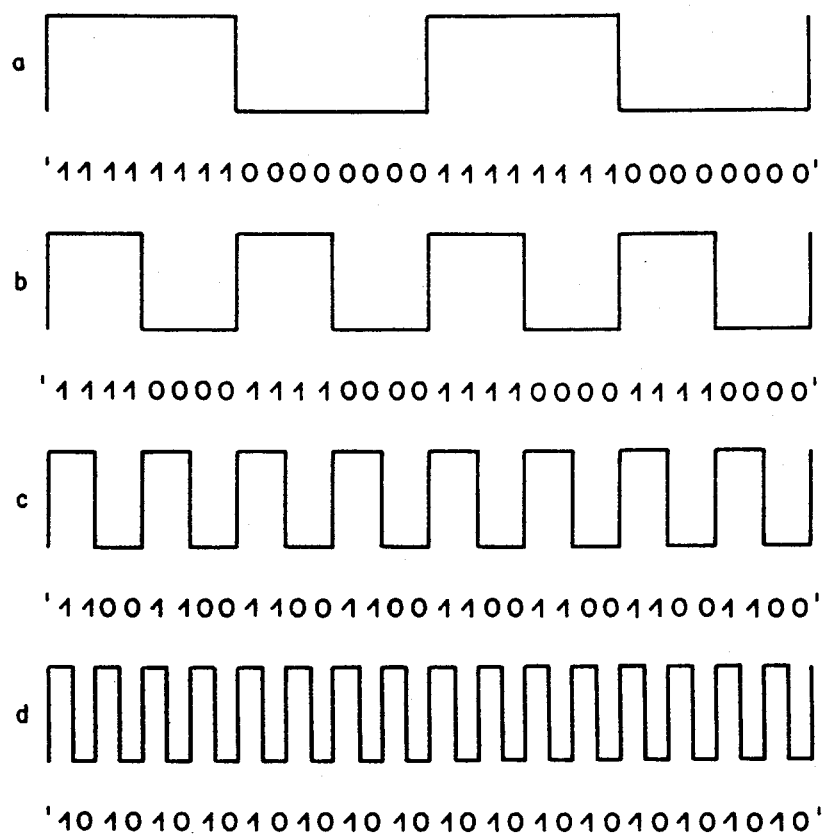
FIG. 4 shows pulse diagrams of pre-sequences.

FIG. 4 shows comparative pulse diagrams of a predetermined sequence of "pre-sequence" of alternating binary values "0" and "1", more specifically at 12.5 bd (line a), 25 bd (line b), 50 bd (line c), and 100 bd (line d). As can readily be seen from FIG. 4, with synchronization which is adapted to the 100 bd transmission rate, the bit pulse series of the pre-sequence comprises the following original bit sequence:

at 12.5 bd: 1111111100000000 . . .
at 25 bd: 1111000011110000 . . .
at 50 bd: 1100110011001100 . . .
at 100 bd: 1010101010101010 . . .

Therefore, at rates of 50 bd, 25 bd, and 12.5 bd, two, four and eight successive original bits of the pre-sequence are of the same binary value "1" or "0", in contrast to the 100 bd transmission rate in which the logic values alternate, as is normally required for synchronization. The receiver only knows the transmission rate which is to be expected, and must synchronize the original bit clock frequency 100 Hz, by means of the received bit, in such a way that it is not only just at a rate of 100 bd, but also, at the lower transmission rates, that the bit commencement coincides with the commencement of the correct first original bit of a transmitted bit pulse series, and not with that of one of the subsequent original bits of the same 100 bd bit duration, otherwise transmission and reception bits do not coincide in respect of time but overlap, once the transit delays are disregarded.

If same binary values of the original bits are received in succession, then the differences $\Delta G_i$ between successive quality factors $G_i$ are small. If, however, there is a change in binary value, then the difference $\Delta G_i$ is very high in absolute terms, at that change, because the quality factor jumps from a high positive quality factor $G_i$ to a quality factor $G_{i+1}$, which is equally negative in absolute terms, or vice-versa, depending on whether the change is from "1" to "0" or from "0" to "1".

A synchronizing circuit 1 is provided for each of the lower transmission rates. The synchronizing circuit 1 shown in FIG. 1 is designed for a 25 bd transmission rate, that is to say, the shift register 41 thereof comprises four plus one m-bit cells and the differencing means 42, the true/complement means 43 and the synchronizing memory 38 each comprise four m-bit cells. The circuit has four adding circuits 44, 45, 46 and 47. At 50 bd, the number four is replaced by the number two, while at 12.5 bd the number is replaced by the number eight.

Five successive m-bit quality factors $G_i$ are written serially from the quality factor memory into the shift register 41 of the synchronizing circuit 1, and stored therein. The differencing means 42 forms the four successive quality factor differences $\Delta G_i$ of a 100 bd bit duration, that is to say, of an original bit. The true/complement means 43 forms the absolute value of those four new quality factor differences $\Delta G_i$, which are subsequently added in modulo four, by means of the four adding circuits 44, 45, 46 and 47, to the associated preceding value in respect of those differences, and subsequently stored in the associated cells 38a, 38b, 38c and 38d of the synchronizing memory 38. At a rate of 50 bd, addition is to be in modulo two, while at 12.5 bd addition is to be in modulo eight. Whenever there is a change in the binary value of an original bit, the summed memory value $\Sigma |\Delta G_i|$ of the quality factor difference suddenly rises very sharply to form a peak. That peak is confirmed again and again during following telegram bit duration when correct synchronization is realized.

Figure 5:
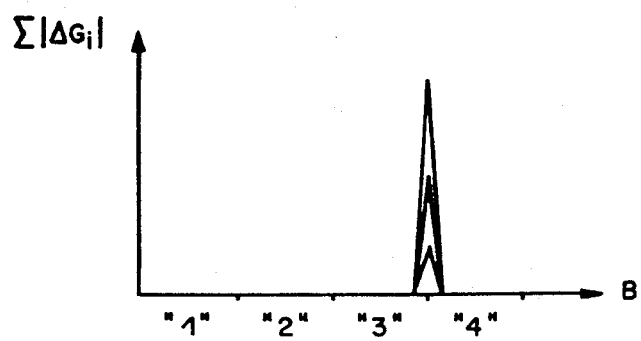
FIG. 5 is a graph illustrating peak detection.

FIG. 5 is a graph illustrating detection of the above-mentioned peak, the abscissa denoting the serial number B of the original bit of a telegram bit, while the ordinate denotes the value of the summed quality factor difference $\Sigma |\Delta G_i|$. A maximum decision circuit 39, for example such a circuit as shown in FIG. 2 which is designed for 25 bd, detects the position in time of the peak, for example at the commencement of every fourth original bit, codes that time value by means of the coder 40, and subsequently evaluates the coded time value by means of the counter 37. The counter 37 operates as a modulo 4-down counter and is reset in a manner known per se by means of the reset input 3 at the beginning of reception of the binary received signals. With a rate of 50 bd the counter 37 is a modulo 2-down counter while, at a rate of 12.5 bd, it is a modulo 8-down counter. The counter value is decoded by means of the AND-gate 48 and the edge or flank of the decoded counting value signal produces, by means of the pulse generator 49, those clock pulses, the edges or flanks of which are used in a subsequent circuit (not shown) to synchronize the received bits. That circuit is for example a D-type flip-flop, the data or D-input of which is connected to the data output 5 while the clock input thereof is connected to the clock output 4 of the synchronizing circuit 1. At the same time, the clock pulses serve for setting the counter 37. Only the most significant bit (MSB) of the quality factor $G_i$ having the maximum summed quality factor difference reaches after inversion the data output 5 of the synchronizing circuit 1, by means of the associated AND-gate 50, 51, 52 or 53 and the OR-gate 54. Therefore, time detection of the peak permits automatic synchronization of the telegram pulse series, irrespective of the transmission rate, to the commencement of the correct original bit.

This will now be described in greater detail by means of a numerical example: The presence of noise with low quality factors $G_i$ was assumed, during 15 original bits, followed by a telegram bit, consisting of four original bits, of a binary value "1", with high positive quality factors $G_i$, followed in turn once again by the first original bit of the second telegram bit of a binary value "0", with an in absolute value very high negative quality factor $G_i$. The Table A of FIG. 6 serves to illustrate this.

The first semicolon in the Table A shows the commencement of the first telegram bit and the second semicolon shows the commencement of the second telegram bit. The synchronizing memory 38 (FIG. 1), for a rate of 25 bd, has four m-bit cells 38a, 38b, 38c and 38d bearing the addresses "3", "2", "1" and "0", which are run through in the specified time sequence, beginning at the address "3". The absolute values of the quality factor differences $\Delta G_i$, which are associated with the first four original bits, are written into the synchronizing memory 38: the value 5 (see Table A—fourth line) under the address "3", the value 2 under the address "2", the value 1 under the address "1" and the value 6 under the address "0". It is assumed that the maximum summed quality factor difference must always correspond to the address "3". With value 6, the fourth original bit has the highest quality factor difference of the first four original bits so that its address must be altered by setting the counter 37 from "0" to "3" or, as the evaluation step has missed the proper moment, the address of the fifth original bit must be reduced from "3" to "2", that of the sixth original bit must be reduced from "2" to "1", and that of the seventh original bit must be reduced from "1" to "0". Whenever the address "0" is reached, a maximum decision takes place, that is to say therefore, after the seventh bit, and more particularly the four summed quality factor differences which are then in store, in this case therefore the fourth to seventh original bits. Being of a value 7, the fifth original bit is of the highest summed quality factor difference: the address of the fifth original bit must therefore be altered to "3", that of the sixth original bit must therefore be altered to "2", that of the seventh must be altered to "1" and that of the eight must be altered to "0". Because the decision takes place after the seventh bit, it is too late to alter the fifth, sixth and seventh original bit. For this reason only the eighth original bit is altered. After the eighth original bit, a maximum decision again takes place, with the result that the eight bit has the highest decision value, being of a value 9, and the address of the ninth bit is to be altered to "2", that of the tenth bit is to be altered to "1" and that of the eleventh is to be altered to "0". It is subsequently confirmed that the eighth original bit has the highest decision value so that no alterations in address then have to be effected. The twelfth original bit therefore keeps the address "3", the thirteenth the address "2", the fourteenth the address "1" and the fifteenth the address "0". It is easy to check that the twelfth, sixteenth and twentieth original bits retain their address "3", so that the other bits therefore retain their respective addresses. Accordingly, beginning at original bit No. 1, the complete sequence of the successive addresses is: "3", "2", "1", "0", "2", "0", "1", "0", "2", "1", "0", "3", "2", "1", "0", "3", "2", "1", "0", "3". (See Table A, fifth line.)

Therefore, the sixteenth and the twentieth original bit, that is to say, the first original bit of each of the two telegram bits, have each in their group of four successive original bits, the highest summed quality factor difference and are thus at address "3", so that both telegram bits of the transmission rate 25 bd are correctly synchronized to their first original bit.

There are four situations:

The higest decision value already corresponds to the address "3": in that case, there is no need for a change of address and the counter 37 does not need to be set.

The highest decision value corresponds to the address "2": in that case, a new decision must be made after $3-2=1$ original bit, and the counter 37 must therefore be set to the value "1".

The highest decision value corresponds to the address "1": in that case, a new decision must again be taken after $3-1=2$ original bits, and the counter 37 must therefore be set to the value "2".

The highest decision value corresponds to the address "0": in that case, a new decision must again be taken after $3-0=3$ original bits, and the counter 37 must therefore be set to the value "3".

The four storage values of the synchronization memory 38, bearing the addresses "0", "1", "2" and "3", are passed to the four bus inputs of the maximum decision circuit 39 (see FIG. 2). The two digital values associated with the addresses "0" and "1" are digitally compared together in the comparator 56, while those which are associated with the addresses "2" and "3" are digitally compared in the comparator 55. If the value of the address "0" is higher than or equal to the value of the address "1" or if the value of the address "2" is higher than or equal to the value of the address "3", then a binary value "1" appears at the output of the OR-gate 58 or at the output of the OR-gate 57. Those binary values "1" switch the values of the address "0" or the address "2" to one of the two inputs of the comparator 65. If on the other hand the value of the address "0" is lower than the value of the address "1" or if the value of the address "2" is lower than that of the address "3", then binary values "1" this time switch the value of the address "1" or the value of the address "3" to one of the two inputs of the comparator 65. The comparator 65 then compares the highest of the two values associated with the addresses "0" and "1", with the highest of the two values associated with the addresses "2" and "3". Then, by means of one of the four AND-gates 67, 68, 69 and 70, the comparator 65 then enables the output which is associated with the highest of those values and thus also the output which is associated with the highest of the four input values of the circuit 39, so that a binary value "1" accordingly reaches the corresponding input of the coder 40. (See FIG. 1.)

A binary value "1" appears at only a single respective one of the four inputs of the coder 40 (see FIG. 3). If the value of the address "3" is the highest, then the combination "00" occurs, if the value of the address "2" is the highest, then the combination "01" appears, if the value of the address "1" is the highest, then the combination "10" occurs, while if the value of the address "0" is the highest, then the combination "11" appears, at the 2 bit output of the coder 40. This combination which digitally corresponds to one of the values "3", "2", "1" or "0" then set in the counter 37.

Instead of the maximum decision circuit 39 and the coder 40, it is also possible to use a microcomputer. The synchronizing memory 38 is then a random access memory of the microcomputer and the maximum decision step with subsequent coding is effected by a comparison operation in an arithmetic logic unit of the microcomputer.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In an apparatus for synchronizing received binary reception signals whose bit duration is an integral multiple n of the duration of an original bit, wherein the original bit is already synchronized and has a duration which is equal to the bit duration of that received signal which has been transmitted at the highest available transmission rate of other possible transmission rates, each other possible transmission rate being said highest transmission rate divided by a selectable integral divisor, and wherein each original bit, having a serial number and an address, has a reception quality factor which is stored in time succession in respect of the individual original bits in a common quality factor memory, in combination:

means operative for forming the quality factor differences of successive original bits, means operable for adding the quality factor differences of those original bits which have the same serial number within a received bit, means for determining the maximum of the summed quality factor difference of n successive original bits, and means for continuously adapting the addresses of the original bits in such a way that the address of the original bit having the maximum summed quality factor difference is assigned a given, constant and predetermined value so that said original bit will be used as the first original bit of a received bit, for synchronization whereby the received signal is automatically synchronized also at any one of said other possible transmission rates.

2. Apparatus according to claim 1, wherein the means for determining the maximum comprises a maximum decision circuit.

3. Apparatus according to claim 2, wherein the means for adapting the addresses comprises a counter and a coder.

4. Apparatus according to claim 1, wherein the means for determining the maximum and the means for adapting the addresses comprises a microcomputer.

5. In a method of synchronizing received binary signals whose bit duration is an integral multiple n of the duration of an original bit, wherein the original bit is already synchronized and has a duration which is equal to the bit duration of that received signal which has been transmitted at the highest available transmission rate of other possible transmission rates, each other possible transmission rate being said highest transmission rate divided by a selectable integral divisor, and wherein each original bit, having a serial number and an address, has a reception quality factor which is stored in time succession in respect of the individual original bits in a common quality factor memory, the steps comprising:

forming the quality factor differences of successive original bits, adding the quality factor differences of those original bits which have the same serial number within a received bit, determining the maximum of the summed quality factor differences of n successive original bits; and continuously so adapting the addresses of the original bits in such a way that the original bit having the maximum summed quality factor difference is assigned to a given, constant and predetermined value so that the address of the original bit will be used as the first original bit of a reception bit for synchronization, whereby the received signal is automatically synchronized also at any one of said other possible transmission rates.

* * * * *